United States Patent
Sternheim

(10) Patent No.: US 12,202,628 B2
(45) Date of Patent: Jan. 21, 2025

(54) ATTITUDE CONTROL SYSTEM AND METHOD

(71) Applicant: Urugus S.A., Montevideo (UY)

(72) Inventor: Mariano Sternheim, Caba (AR)

(73) Assignee: Urugus S.A., Montevideo (UY)

( * ) Notice: Subject to any disclaimer, the term of this patent is extended or adjusted under 35 U.S.C. 154(b) by 770 days.

(21) Appl. No.: 17/427,031

(22) PCT Filed: Jan. 30, 2020

(86) PCT No.: PCT/US2020/015946
§ 371 (c)(1),
(2) Date: Jul. 29, 2021

(87) PCT Pub. No.: WO2020/160314
PCT Pub. Date: Aug. 6, 2020

(65) Prior Publication Data
US 2022/0097872 A1     Mar. 31, 2022

Related U.S. Application Data

(60) Provisional application No. 62/799,549, filed on Jan. 31, 2019.

(51) Int. Cl.
*G05D 1/00*     (2024.01)
*B64G 1/10*     (2006.01)
(Continued)

(52) U.S. Cl.
CPC ............. *B64G 1/244* (2019.05); *B64G 1/10* (2013.01); *B64G 1/28* (2013.01); *B64G 1/36* (2013.01); *G05D 1/0808* (2013.01); *B64G 1/245* (2023.08)

(58) Field of Classification Search
USPC ....................................................... 701/3–18
See application file for complete search history.

(56) References Cited

U.S. PATENT DOCUMENTS

| | | | | |
|---|---|---|---|---|
| 4,883,244 A | * | 11/1989 | Challoner | B64G 1/28 244/164 |
| 5,335,179 A | * | 8/1994 | Boka | B64G 1/244 701/13 |

(Continued)

OTHER PUBLICATIONS

Hammett, et al., "Controllability Issues in Nonlinear State-Dependent Riccati Equation Control", Oct. 1998, Journal of Guidance Control, and Dynamics, vol. 21, No. 5, pp. 767-773, Retrieved from the Internet: <URL: 1-3. 5-8. 15-17,1922https://arc.aiaa.org/doi/abs/10.2514/2.4304>.

(Continued)

*Primary Examiner* — Jonathan L Sample
(74) *Attorney, Agent, or Firm* — Lee & Hayes, P.C.

(57) ABSTRACT

Systems and method for controlling the attitude maneuvers of a spacecraft in space are provided. The method automatically generates optimal trajectories in real-time to guide a spacecraft, providing a much more robust and efficient method than predefined trajectories, to model errors or disturbances. These methods do not rely in predefined trajectories and their associated feed-forward term. The systems comprise sensors, attitude control mechanisms, and a control module to orient the spacecraft in real-time, such that the spacecraft reaches a desired target attitude following an optimal path in the state space and is locally and asymptotically stable.

13 Claims, 7 Drawing Sheets

(51) Int. Cl.
  *B64G 1/24* (2006.01)
  *B64G 1/28* (2006.01)
  *B64G 1/36* (2006.01)

(56) References Cited

U.S. PATENT DOCUMENTS

| | | | | |
|---|---|---|---|---|
| 6,003,817 | A * | 12/1999 | Basuthakur | B64G 1/50 |
| | | | | 701/13 |
| 6,456,906 | B1 * | 9/2002 | Hua | G05D 1/107 |
| | | | | 701/13 |
| 6,594,582 | B1 * | 7/2003 | Quinn | G01S 5/0247 |
| | | | | 701/4 |
| 6,760,664 | B1 * | 7/2004 | Julie | G01S 19/14 |
| | | | | 342/357.68 |
| 8,532,847 | B1 * | 9/2013 | Andoh | B64G 1/52 |
| | | | | 703/2 |
| 8,880,246 | B1 * | 11/2014 | Karpenko | B64G 1/36 |
| | | | | 701/13 |
| 9,038,958 | B1 * | 5/2015 | Ross | B64G 1/286 |
| | | | | 701/13 |
| 2003/0058927 | A1 | 3/2003 | Douglas | H04B 1/7085 |
| | | | | 375/147 |
| 2011/0082604 | A1 * | 4/2011 | Lam | F42B 15/01 |
| | | | | 701/4 |
| 2013/0046520 | A1 * | 2/2013 | Bolle | B64G 1/2427 |
| | | | | 703/2 |
| 2014/0188774 | A1 * | 7/2014 | George | G06N 7/08 |
| | | | | 706/46 |
| 2014/0236401 | A1 * | 8/2014 | Tsao | B64G 3/00 |
| | | | | 701/13 |
| 2014/0379176 | A1 * | 12/2014 | Ross | B64G 1/244 |
| | | | | 701/3 |
| 2016/0194095 | A1 * | 7/2016 | Weiss | B64G 1/283 |
| | | | | 701/13 |
| 2016/0355279 | A1 * | 12/2016 | Lim | B64G 1/242 |
| 2016/0363937 | A1 * | 12/2016 | Becker | B64G 1/244 |
| 2017/0269610 | A1 * | 9/2017 | Weiss | B64G 1/286 |
| 2019/0049998 | A1 * | 2/2019 | Weiss | B64G 1/262 |
| 2019/0049999 | A1 * | 2/2019 | Weiss | B64G 1/26 |
| 2019/0286168 | A1 * | 9/2019 | Weiss | B64G 1/244 |
| 2021/0094705 | A1 * | 4/2021 | Asano | B64U 50/18 |

OTHER PUBLICATIONS

Massari, et. al., "Application of SORE Technique to Orbital and Attitude Control of Spacecraft Formation Flying", Feb. 2013, Acta Astronautica, Vo. 94, Issue 1, pp. 1-40, Retrieved from the internet: <URL:https://re.public.polimi.it/retrieve/handle/11311/713356/399617/MASSM_ OA_01-14.pdf>.
PCT Search Report and Written Opinion mailed on Apr. 16, 2020, for PCT Application No. PCT/US2020/015946, 13 pages.
Won, et. al., "Nonlinear Orbital Dynamic Equations and State-Dependent Riccati Equation Control of Formation Flying Satellites", Jul. 2004, Journal of the Astronautical Science , vol. 51, No. 4, pp. 1-29, Retrieved from the Internet: <URL:https://pdfs.semanticscholar .org/204c/1a17ac45aa8959ae25ba46d24a4e 1 fbOfaaO .pdf>.
European Office Action mailed on Feb. 20, 2024 for European Patent Application No. 20748966.7, a foreign counterpart of U.S. Appl. No. 17/427,031, 5 pages.
European Search Report mailed on Aug. 30, 2022, for European Patent Application No. 20748966.7, a foreign counterpart of U.S. Appl. No. 17/427,031, 5 pages.
Israeli Office Action mailed on Jan. 7, 2024 for Israeli Patent Application No. 285135, a foreign coutnerpart of U.S. Appl. No. 17/427,031, 4 pages.
Panfeng, et al., "Attitude takeover control for post-capture of target spacecraft using space robot", Aerospace Science and Technology, Elsevier Masson, FR, vol. 51, Feb. 10, 2016, pp. 171-180.
PCT IPRP dtd Aug. 12, 2021.
Sutherland, et al., "Attitude Control of a 2U Cubesat by Magnetic and Air Drag Torques", arxiv.org, Cornell University Library, 201 Olin Library Cornell University Ithaca, NY 144853, Jul. 17, 2017.

* cited by examiner

ATTITUDE CONTROL SYSTEM AND METHOD

CROSS REFERENCE TO RELATED APPLICATIONS

This application is a US national stage entry of International Patent Application No. PCT/US20/15946, filed Jan. 30, 2020, which claims priority to U.S. Provisional Application No. 62/799,549, filed Jan. 31, 2019, entitled "ATTITUDE CONTROL SYSTEM AND METHOD," the entire contents of which are incorporated herein in their entirety by reference.

BACKGROUND

In many applications, the adequate control of the orientation or attitude of a vehicle is of essential importance. After sensing the vehicle's orientation, the actuators are commanded to apply torques to re-orient the vehicle to a desired attitude. In aerospace, most spacecraft make use of active control techniques using different types of attitude control methods, depending on the implementation and the requirement for a particular maneuver. The most common approach to orient a spacecraft in space is to define trajectories that the spacecraft can follow to achieve the desired orientation, apply these predefined trajectories, and linearize the system for every appropriate operation point. However, many uncertainties or fortuitous deviations from predefined trajectories usually arise given the markedly nonlinear systems that govern spacecraft attitude, making these methods highly defective. Consequently, there is a need for more robust systems and methods to determine trajectories to orient a spacecraft in space.

SUMMARY

The systems and methods for attitude control of moving vehicles described herein provides optimal control methods including feedback control techniques for onboard, real-time attitude control. The theory of optimal control involves operating a dynamic system at minimum cost. In some cases, a dynamic system may be modelled or described by a set of linear differential equations and the cost may be described by a quadratic function, so an optimal control technique for this system involves a feedback controller known as a linear-quadratic regulator (LQR). For linear systems the LQR minimizes a quadratic cost function which integrates the weighted state vector error and the weighted control effort, via solving the Riccati equation for a state-linear control law. However, many systems cannot be modelled as a linear dynamic system. In fact, many highly-nonlinear systems exist, such as the Eulerian dynamics and attitude kinematics that govern spacecraft attitude. Hence, conventional strategies commonly used for spacecraft attitude control present several drawbacks. For example, Lyapunov derived control laws are usually difficult to tune and may heavily tax the actuators. Likewise, nonlinearities of LQRs may pose problems, or linear control techniques extended to nonlinear systems, such as proportional-integral-derivative (PID) controllers, can require the addition of a trajectory guidance loop. Moreover, stability can be hard to prove. Whenever a guidance loop is added, fortuitous deviations from the trajectory can render the system to perform suboptimally. In this scenario, the LQR cannot be implemented successfully without a feed-forward term, and without linearizing the system for every appropriate operation point. For this reason, if the system is nonlinear, the technique for attitude control is often applied to the linearized system where the LQRs are normally used for the state vector to track a desired trajectory in the state space, via a feed-forward term in the control law. The trajectory is often found by running an offline LQR with ideal dynamics and regulator performance. The operation point where the system is linearized is approximately known, and so is the accuracy of the chosen linearization and when it needs to be updated.

To deal with these concerns, embodiments include systems and methods for attitude control comprising the use and design of an optimal regulator for nonlinear systems derived from the State-Dependent Riccati Equation (SDRE) technique, which is a nonlinear extension of the optimal LQR. One of the main advantages of the systems and methods for attitude control described herein is that the optimal regulator is configured to autonomously find optimal trajectories in the state space in real-time, without the need of predefined trajectories in the state space and their related feed-forward terms. Another advantage is that the optimal regulator is configured to determine the control law and evaluate it at multiple steps (e.g., every step), providing a robust control system that works properly in the event of unmodeled disturbances, system modeling or numerical errors, potential trajectory mishaps due to actuators momentary saturation or glitches, and/or on-board computer or network delays. Together with local and asymptotic stability, these features add up to highly reliable systems and methods for attitude control.

In a non-limiting example, a satellite may need to change its attitude or orientation in an efficient and precisely controlled manner, as illustrated in the following scenarios. A satellite may receive or generate instructions to change or maintain its orientation to perform a variety of tasks, for example to accurately point to a specific zone of the Earth to gather information, to capture imaging data, to point an antenna for reception/transmission, to orient the satellite for a smart thermal control using the heating and cooling effects of sunlight and shadow, to align the solar panels in order to optimize sun energy collection, to maintain or adjust its a forward facing orientation during a drag control maneuver, and/or to perform controlled propulsion maneuvers. These changes of orientation may occur numerous times during the satellite's lifetime, and given that the satellite is a system with limited computing and power resources, it is desirable to have an efficient, robust and reliable control system configured to provide control actions to perform all ranges of attitude maneuvers, including large and arbitrary spacecraft attitude maneuvers, so that the sequence of orientations described to reach a target orientation comprises an optimal orientation trajectory, in the sense of minimizing the spent sum of norm of torques (hence energy). The methods and systems for attitude control described herein provide strong stability results, relatively low computing burden so the methods can be implemented in platforms with limited resources, optimality results, and robustness to unmodeled effects and perturbations, providing convergent attitude control maneuvers.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
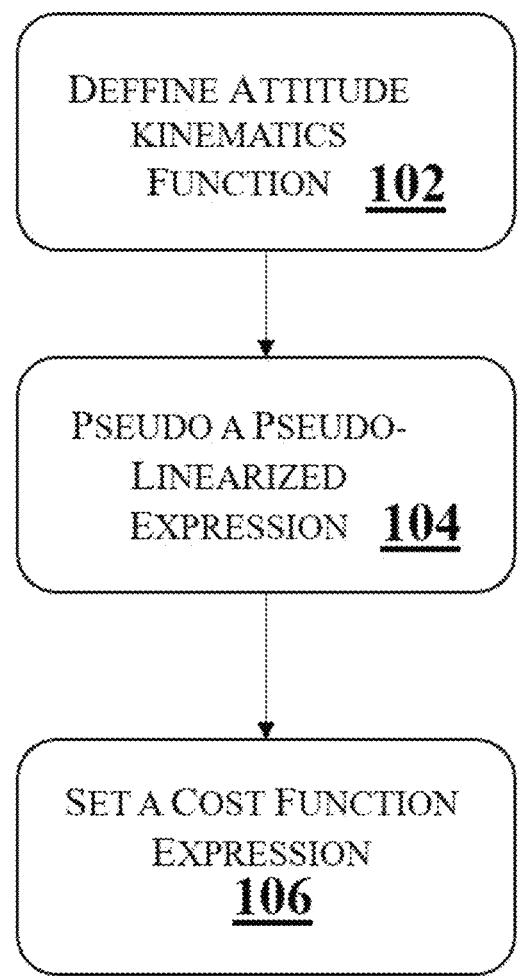
FIG. 1 is a flow diagram showing an example overview process for designing a regulator for attitude control according to embodiments of the present disclosure.

Embodiments according to present disclosure include systems and methods for attitude control to autonomously generate control actions so that the sequences of orientations to reach or maintain a target orientation define optimal trajectories in real-time for a spacecraft s attitude maneuvers, ranging from small to large maneuvers, and constrained or unconstrained attitude maneuvers, providing a much more robust and efficient attitude control. As used herein, the term spacecraft refers to any manned or unmanned vehicle that travels in space. It will be appreciated that the systems and methods described herein may also be used for attitude control of other manned or unmanned vehicles in motion that need attitude or orientation corrections, such as aerial vehicles that can travel in air such as an aircraft, a balloon or a drone, or terrestrial or maritime vehicles.

Embodiments include methods for controlling attitude maneuvers of a vehicle, the method comprising determining a control law to be applied for example by a controller or control system. The evaluation of the control law may cause an attitude control mechanism to generate one or more attitude maneuvers, such as momentum of force or torque. In some instances, the sequence of the one or more attitude maneuvers defines and/or generates an orientation trajectory that the vehicle follows to transition from an initial orientation to a final (target) orientation. In other instances, the attitude maneuvers (torques) maintain the orientation of the vehicle without involving a transition from an initial to a final orientation, since both may be the same or the transition may involve a continuous movement, for example, when an Earth observation satellite needs to acquire images by constantly pointing towards Nadir or by continuously performing a scanning movement or following an object in the ground. The fact that the control law is evaluated (solved) in real-time makes this method suitable and efficient for Nadir pointing, longer (in time) maneuvers or maneuvers guided by a higher level algorithm providing an advantage over conventional methods.

As used herein, an orientation trajectory refers to a trajectory defined in the state space comprising the orientation and angular velocity of the vehicle, and a path refers to a sequence of angles instead of a sequence of positions in the space. The term control law as used herein, refers to programming instructions which, once executed (evaluated), determine the control action that is to be taken at any instant. The control law may be determined in a design step, and subsequently evaluated during operation. In some implementations, the control law may be executed at multiple steps (e.g., every step) autonomously generating orientation trajectories in the state space providing real-time optimal guidance and eliminating the need of using predefined trajectories in the state space calculated offline and their related feed-forward terms. Consequently, if a disturbance was previously unmodeled, the orientation trajectories described herein would take into account the unmodeled disturbance, since the orientation trajectories are defined in real-time from the disturbed orientation trajectory at multiple steps (e.g. every step), providing optimal orientation trajectories. By contrast, other vehicles using a predefined trajectory would not be able to consider the unmodeled disturbance and would follow the calculated trajectory without being able to change it, even though it would not be the optimal trajectory due to appearance of the unmodeled disturbance.

In some embodiments, the control law that causes the vehicle to follow orientation trajectories through the attitude maneuvers e.g. applied torques, is executed by a controller, such as an optimal nonlinear regulator. The optimal nonlinear regulator is configured for attitude control to autonomously execute a control law to provide orientation trajectories in the state space to guide a vehicle. The orientation trajectory may be an optimal orientation trajectory, defined as an orientation trajectory that minimizes some measure of performance while satisfying a set of constraints. In some implementations, for a vehicle having a determined angular speed (velocity) and angular acceleration, the control law, when executed, causes the vehicle to follow an orientation trajectory that is optimal in the sense that the orientation trajectory describes a path in the state space wherein the sum of the forces of rotation (torques) are minimum for a target angular acceleration and target angular speed. The target angular acceleration and speed are determined according to the task that the vehicle is going to perform. For example, for a low-earth orbiting satellite, different target angular accelerations and speeds may be defined taking into account the physical characteristics of the actuators and whether the satellite needs to scan an area for imaging purposes, point to a ground station for communication purposes, or track a target. The control law may be executed in real time using feedback from the system instead of computing an open-loop solution to an optimal control problem, which involves executing the control law for a dynamical system at multiple steps (e.g. every step) over a period of time, such that a cost function is optimized at the multiple steps (e.g. every step).

In some embodiments, the control law is evaluated at multiple steps (e.g. every step) of a path to apply torques to describe optimal orientation trajectories, and comprises, for each of the multiple steps, determining weighting factors of a cost function and minimizing the cost function. In some implementations, the cost function is minimized by solving the Algebraic Riccati Equation (ARE) to execute the control law (programming instructions). The cost function is often defined as a sum of the norm of the deviations of angular position and angular velocity from their desired values, plus the sum of the norm of the torques. The control law thus finds those forces of rotation (torques) that when applied by an attitude control mechanism minimize the cost function, thus reducing the state error spending the minimum sum of the norm of the control effort. The controller may be an optimal nonlinear regulator that minimizes a cost function that weights the state error and the control effort and is locally and asymptotically stable. The optimal nonlinear regulator minimizes the angle error and angular velocity error at multiple steps (e.g. every step) taking into account the attitude state estimated at each step, so that the sum of the norm of the one or more torques applied to orient the vehicle is minimum and the orientation trajectory generated is an optimal orientation trajectory in the sense of minimizing the spent sum of norm of torques.

The generated orientation trajectory is constructively optimal in relation to the requirements of the vehicle. Autonomously-generated optimal orientation trajectories are shaped by the cost function that weights the state error and control effort. In some implementations, the relative weights are adjusted as a function of one or more zones of the state-space, making the tuning very simple and defining the vehicle's behavior over the optimal trajectory—acceleration, cruising angular speed, convergence time to target, torque of the different actuators, or penalizing areas of the sate-space that are less desirable. This type of tuning is much simpler and efficient than setting several LQ-derived control laws or Lyapunov-derived control laws, due to working directly with costs in the state space. The optimal orientation trajectory is thus calculated at multiple steps (e.g., each step) of the path to reach the final target attitude.

The method may further comprise the step of determining, based at least in part on the sensed vehicle orientation, an estimated attitude state. The input to the regulator (optimal nonlinear regulator) is the attitude error defined by the difference between the estimated attitude state provided by the vehicle's sensor(s) and the target attitude state. The output of the regulator is the control law. The control law may be determined based at least in part on the estimated attitude state. In some implementations, the output is a full state nonlinear feedback control law. The nonlinear feedback control law may be based at least in part on a State Dependent Riccati Equation (SDRE) technique. The control law may be implemented and tuned by setting the relative weight of the state error and control effort as a function of regions of the state-space.

The method may further comprise the step of directing an attitude control mechanism to orient the vehicle applying/executing the control law. In some instances, the control law is executed by an optimal nonlinear regulator at multiple steps (e.g. at every step), so that the sequence of orientations describes optimal orientation trajectories in the sense of minimizing the sum of the norm of the torques used to orient the vehicle. The attitude control mechanism is configured to apply force(s) of rotation (torques) determined by the control law so that the vehicle follows (e.g., constantly follows) optimal orientation trajectories, wherein the orientation trajectory is optimal in the sense that the orientation trajectory describes a path in the state space wherein the sum of the forces of rotation (torque) are minimum for a target angular acceleration and target angular speed. The evaluation of the control law at each operation point allows a real-time attitude maneuvers control since the optimal control action is defined at each operation point, providing an autonomous control system.

Embodiments also include a method to design a regulator for attitude control to set a control law comprising the steps of obtaining the mathematical expression representing the kinematics and dynamics of a system; obtaining a pseudo-linearized expression of the mathematical expression; and setting a cost function comprising a state error cost and a control effort cost. The cost function may be set based on the pseudo-linearized expression of the mathematical expression, and/or may be a quadratic cost function. The cost function may be adjusted as a function of one or more zones of a state space. The pseudo-linearized expression of the mathematical expression may be obtained by defining State-Dependent Coefficients (SDC). The control law is evaluated by minimizing the cost function. The cost function is minimized by solving the Algebraic Riccati Equation (ARE) in response to a state vector. The ARE may be solved at multiple steps, in response to a state vector. The control law may be executed at multiple steps as time evolves and the state vector changes, so that this feedback updates the control action. Applying such feedback until convergence minimizes the cost function for the full maneuver.

Embodiments include an on-board attitude control system for controlling the attitude maneuvers of a vehicle, the system comprising a controller configured to autonomously evaluate a control law. The system may apply (evaluate) the control law to control attitude maneuvers at multiple steps (e.g. every step), generating real-time optimal orientation trajectories in the state-space instead of directing an attitude control mechanism to follow predefined trajectories calculated offline. In some embodiments, the controller may comprise an optimal nonlinear regulator. The controller is configured to evaluate a control law comprising instructions which, when executed by the control system cause the vehicle to generate one or more attitude maneuvers, such as torques, describing an optimal orientation trajectory in the sense of minimizing the sum of the norm of the torques used to orient the vehicle in the state-space form to be applied for example by the attitude control mechanism to orient the vehicle following the optimal orientation trajectory.

In some embodiments, the optimal nonlinear regulator is configured to provide a control law that causes the vehicle to describe orientation trajectories in real-time using a nonlinear extension of a technique for linear systems using a State-Dependent Riccati Equation (SDRE) technique, a nonlinear extension of the optimal LQR. The optimal nonlinear regulator uses a nonlinear feedback control law to define the torques to apply to the vehicle, wherein the resulting orientation trajectory of applying such torques is the optimal orientation trajectory defined by a cost function that weights the state error and the control effort. The cost function may be a quadratic cost function that integrates the weighted state vector error and the weighted control effort. The controller is configured to minimize an overall cost function to provide the optimal orientation trajectory in the sense of minimizing the sum of the norm of the torques used to orient the vehicle. The cost function is minimized by solving the Algebraic Riccati Equation (ARE) at multiple operation points (e.g., each operation point) to evaluate the control law. As time evolves and the state vector changes, the ARE is solved again and the feedback control law is updated. Applying such feedback until convergence minimizes the cost function for the full maneuver.

Embodiments include a satellite system comprising at least one sensor, an attitude control module, and an attitude control mechanism operable to orient a satellite. The attitude control module is configured to apply a control law to control the attitude maneuvers of a satellite, providing optimal orientation trajectories that the maneuvers follow either to transition an orientation of the satellite from an initial angular position to a final angular position, or to maintain a desired orientation during a predetermined period of time. The attitude maneuvers are controlled based at least in part on a target orientation or target orientation trajectory. The target orientation may be for example a fixed orientation or a continuous movement (target orientation trajectory), and may be determined by a higher level algorithm or a user (either a human or a machine), which may be on-board the satellite, on-board a different satellite or on the ground. In some instances, the target orientation is determined based at least in part on the satellite's tasks, such as capturing images of specific regions of the Earth, propulsion operations, or specific pointing movements.

Among the different types of sensors that a satellite may have, at least one sensor may be an attitude sensor, such as an indirect attitude sensor configured to provide information to estimate the attitude or orientation of the satellite. Usually, with this type of sensor, it is possible to estimate the angular velocity. In some implementations, it is also possible to use one sensor to obtain the angular velocity directly, for example with a gyroscope, and one or more sensors to estimate the attitude, such as a relative or absolute attitude sensor, including, but not limited to, magnetometers, star trackers, horizon sensors, sun sensors, or any combination of these. The at least one sensor may be at least one of a gyroscope, a magnetometer, a star tracker, a horizon sensor, or a sun sensor. The term "at least one of" should be understood to mean that if the satellite has only one sensor, it may be any one of the listed sensors, but if more than one sensor is used, it may be any number of sensors and in any combination.

The attitude control module is configured to provide and/or execute programming instructions to generate one or more attitude maneuvers, such as torques, so that the satellite describes an optimal orientation trajectory in the state-space, in the sense of minimizing the sum of the norm of the torques used to orient the satellite. The programming instructions may be executed at multiple steps (e.g. every step) to direct the attitude control mechanism to orient the spacecraft in real-time following an optimal orientation trajectory at each step. The programming instructions may be executed by setting the relative weight of a state error and a control effort as a function of predetermined regions of the state-space and minimizing a cost function that weights the state error and the control effort by solving a Riccati equation for a control law at each step. The attitude control module may comprise an optimal nonlinear regulator to control or correct spacecraft attitude maneuvers, including large and arbitrary attitude maneuvers. The attitude control module is configured to convert the attitude control problem into a state-space form by defining an attitude kinematics function and an attitude state in terms of angular position (attitude) and angular rates (velocity). In this manner, the control module is configured to convert the spacecraft's attitude estimation from the sensor(s) into an attitude state.

In some embodiments, the attitude control module is further configured to pseudo-linearize the attitude kinematics function. In some instances, the attitude kinematics function is pseudo-linearized by defining State-Dependent Coefficients (SDC). The attitude control module is further configured to define an overall cost function comprising a state error cost and a control effort cost. The attitude control module is further configured to set the relative weight of the state error and control effort as a function of regions of the state-space, rendering the system simple to implement and tune. Doing so is much simpler and efficient than setting several LQ-derived control laws or Lyapunov-derived control laws. It should be understood that even though the detailed description illustrates solutions to the regulation problem, the systems and methods described herein may also be used for tracking problems, with or without extending the state.

The attitude control module is further configured to minimize the overall cost function and is performed by solving the Riccati equation. In some implementations, the overall cost function is minimized by solving the Riccati equation for the control law at multiple operating points (e.g., each operation point). The attitude control module may be configured to execute the programming instructions at multiple steps (e.g., every step) by setting the relative weight of the state error and control effort as a function of predetermined regions of the state-space. The regions of the state-space may be defined constructively depending on the application. The attitude control module may be further configured to direct the attitude control mechanism to orient or maintain the orientation of the spacecraft in one or more steps such that the spacecraft follows the programming instructions describing an optimal attitude orientation, in each of the one or more steps. g The programming instructions may be executed at one or more steps at a time and may be executed in processors residing in environment with limited capabilities, such as satellites, to optimize for example power resources and computing performance, because the programming instructions provided by control module are relatively simple and may be implemented/executed using the Newton-Raphson method setting a limited number of iterations (e.g. a maximum number of iterations) to reach an efficient and satisfactory solution.

The attitude control mechanism is configured or operable to orient the spacecraft by applying forces of rotation through one or more actuators to re-orient the vehicle to the determined attitude orientation. In some embodiments, the attitude control mechanism may be configured to apply torques through the actuators to change or adjust the spacecraft's orientation. The executed programming instructions determine the attitude maneuvers or forces (e.g. torques) that the attitude control mechanism is configured to apply through the actuators to describe an optimal trajectory expressed in the state-space in the sense of minimizing the sum of the norm of the torques used to orient the vehicle. The actuators may be at least one of magnetorquers, reaction wheels, momentum wheels, control momentum gyros, or thrusters. The term "at least one of" should be understood to mean that if the satellite has only one actuator, it may be any one of the listed actuators, but if more than one actuator is used in the satellite, it may be any number of actuators and in any combination, for example two thrusters and four reaction wheels.

Various examples are described herein to aid in illustration, although those examples are not meant to be taken in a limiting sense.

Example Attitude Control Methods

Figure 2:
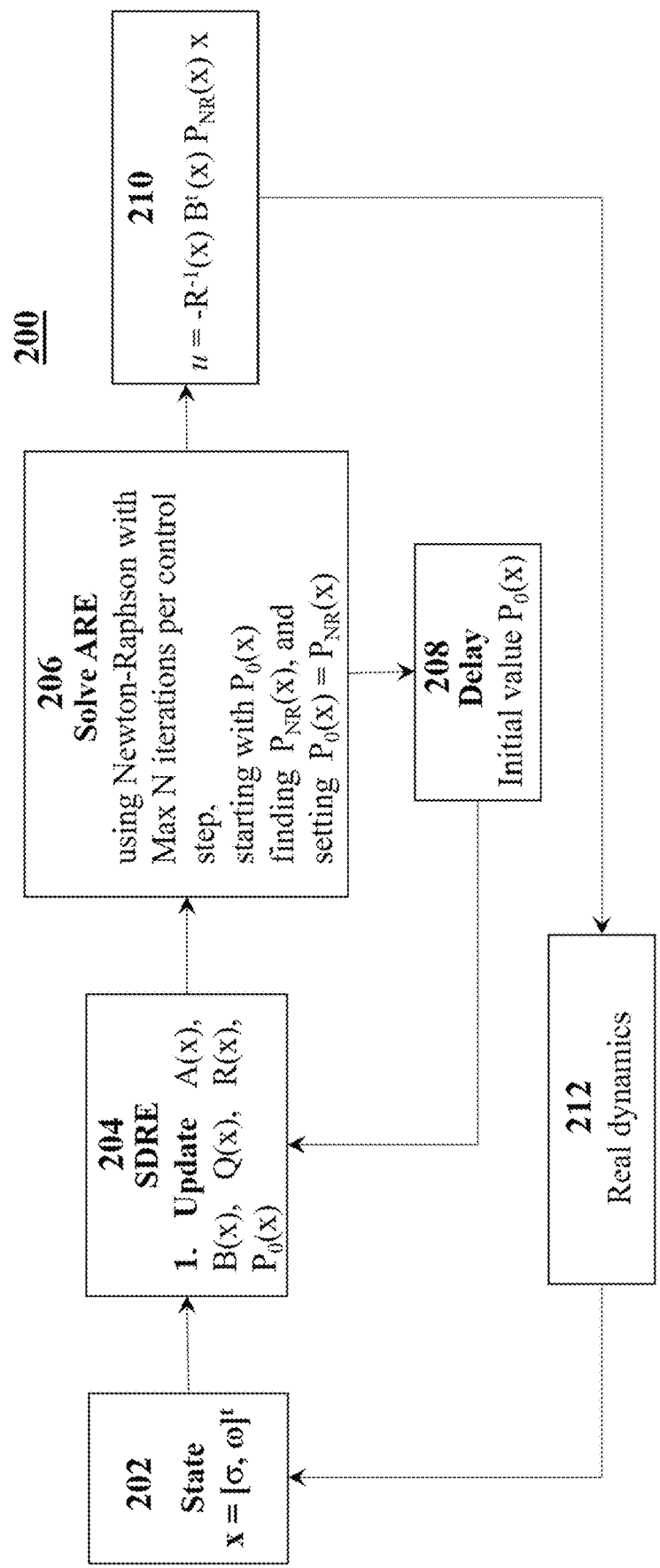
FIG. 2 is a flow diagram showing an example overview process for controlling attitude maneuvers of a satellite system, wherein optimal trajectories are generated in real-time according to embodiments of the present disclosure.

FIGS. 1 and 2 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), a programmable logic device, such as a field programmable gate array (FPGA), graphical processing unit (GPU), tensor processing unit (TPU), or a microprocessor. Other examples of hardware may be used with the embodiments described herein and are contemplated herein as providing the features and benefits described. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard a terrestrial vehicle, watercraft, spacecraft, aircraft, or ground station, or may be shared between multiple systems located with the software-defined communication device and onboard one or more vehicles or ground based systems.

FIG. 1 is a flow diagram showing an example overview process 100 for designing a regulator for attitude control, in order to optimize the path that a spacecraft is to follow to change its attitude from a current orientation defined by an estimated attitude state and a target orientation, wherein the target orientation is defined based on the task to be performed by the spacecraft (e.g. the target orientation will be defined by the specific region of the earth to be imaged by an earth observation satellite). At 102, attitude kinematics and system dynamics functions are defined in terms of angular position and angular velocity. In some implementations, the mathematical expression may describe the kinematics and dynamics equations of the spacecraft using the attitude kinematics for the Modified Rodrigues Parameters (MRP) and the Eulerian dynamics equations for a spacecraft with four reaction wheels.

$$\dot{\sigma} = \tfrac{1}{4}[(1-\|\sigma\|^2)I_{3\times3} + [\sigma\times] + 2\sigma\sigma^t]\omega \tag{1}$$

$$\dot{\omega} = \Pi^{-1}[(\Pi\omega + h_w)\times]\omega + \Pi^{-1}u \tag{2}$$

Where $\sigma \in R^3$ is the Inertial to Body frame MRP vector (which without loss of generality zeroes at desired inertial attitude), $\omega \in R^3$ is the Inertial to Body frame angular velocity vector written in Body frame, $I_{3\times3}$ is the identity matrix $\in R^{3\times3}$, and $u \in R^3$ is the sum of modeled external torques (which will be assumed 0 without loss of generality) plus control torques. $\Pi = J - J_z YY^t$ is the grouped inertia. $J \in R^{3\times3}$ is the inertia matrix of the satellite (including wheels) written in Body frame. $J_z$ is the reaction wheels' inertia along their spin vector and $Y \in R^{3\times4}$ is the matrix which columns are the direction of each spin vector in Body versors. $h_w = J_z(Y_{pwheels} + \Omega)$, where $p_{wheels}$ is the reaction wheel's speed vector, and $\Omega$ is the $\omega$ projected over each spin direction (usually disregarded since $\Omega$ is much less than the wheel speed). $\sigma$ dot and $\omega$ dot are the rate of change of vectors $\sigma$ and $\omega$ respectively, and $[\sigma^\times]$ is the cross-product matrix derived from vector 6.

The attitude kinematics function is defined by the formula:

$$\dot{\sigma} = \tfrac{1}{4}(-\omega\sigma^t - [\omega\times] + 2\sigma^t\omega)\sigma + \tfrac{1}{4}\omega \tag{3}$$

At 104, a pseudo-linearized expression of the attitude kinematics is obtained or defined. The pseudo-linearized expression of the mathematical expression may be in the form of $\dot{x} = A(x)x + B(x)u$, which captures the dependency of the rate of change of the attitude representation vector $\sigma$ with respect to the attitude itself, without making any approximations, which is suitable for highly-nonlinear systems, such as a spacecraft. The state vector x is the stacked column vector of $\sigma$ and $\omega$. It is important to select a pseudo linearization which reflects the nonlinearities of the system that govern spacecraft attitude dynamics. Except for the scalar case, pseudo linearization is not unique, and any convex combination of them can be used. In this example, the selection of the attitude kinematics pseudo linearization and the method to automatically generate, in real-time, the optimal trajectory, provides a locally and asymptotically stable orientation trajectory. For this example, the following pseudo linearization was chosen based on simulated performance, wherein $O_{3\times3}$ is the zeroes matrix $\in R^{3\times3}$:

$$\dot{x} = \begin{bmatrix} \dot{\sigma} \\ \dot{\omega} \end{bmatrix} = \begin{bmatrix} \tfrac{1}{4}(-\omega\sigma^t - [\omega\times] + 2\sigma^t\omega I_{3\times3}) & \tfrac{1}{4}I_{3\times3} \\ O_{3\times3} & -J^{-1}[\omega\times]J \end{bmatrix} \begin{bmatrix} \sigma \\ \omega \end{bmatrix} + \begin{bmatrix} O_{3\times3} \\ J^{-1} \end{bmatrix} u = A(x)x + B(x)u \tag{4}$$

At 106, a quadratic cost function is set, shaped by the state error cost $Q(x) > 0 \in R^{6\times6}$ and the control effort cost $R(x) > 0 \in R^{3\times3}$. The overall cost function is:

$$J(x_0, u) = \tfrac{1}{2} \int [x(t)^t Q(x) x(t) + u(t)^t R(x) u(t)] dt \tag{5}$$

The overall cost function is minimized by solving the Algebraic Riccati Equation (ARE) for $P(x) > 0 \in R^{6\times6}$, and the full state nonlinear feedback control law which computes the torque $u(x)$ is obtained.

$$0 = P(x)A(x) + A(x)^t P(x) - P(x)B(x)R(x)^{-1}B(x)^t P(x) + Q(x) \tag{6}$$

$$u(x) = -R^{-1}(x)B(x)^t P(x) x = -K(x) x \tag{7}$$

Wherein the closed loop system matrix is then:

$$\dot{x} = (A(x) - R^{-1}(x)B(x)^t P(x)) x \tag{8}$$

While the spacecraft changes its attitude from the current state attitude to the target state attitude, the state vector changes, the ARE is solved again, and the feedback control law is updated. Applying such feedback until convergence minimizes the cost function for the full maneuver from the estimated state attitude to a target state attitude.

Since this strategy approximately minimizes the norm of the state error and control effort, if the spacecraft were isoinertial, the path through the state space would be set by the principal rotation vector, and any other path would waste control effort. However, if the spacecraft had differences in its inertia moments, other rotations may be better. The methods of the embodiments presented herein automatically produces the optimal path, without pre-computing maneuvers, regardless of the inertia of the spacecraft, which is a large advantage. Even for simple cases like isoinertial spacecrafts, the methods have the advantage of being robust to unmodeled effects or perturbations. This is because if the predefined path is lost for any reason, solving ARE recovers the optimal path from the current state, whereas a predefined guidance in conventional attitude control techniques will follow the predefined path without taking into account the current state, and will continue towards a target following the predefined path which is not optimal anymore. Another advantage is that it is very easy to tune since $Q(x)$ and $R(x)$ will only shape acceleration, deceleration and cruising speed of the optimal path, via tuning their values by regions of the state space. By this method, pre-computed feed-forward terms for acquiring a desired attitude is avoided. These advantages highly contrast with prior art techniques, such as the LQ and SDRE regulators, which uses the common approach to have the state vector follow an orientation trajectory, which is to set $u(x)=-K(x)e(x)+u_{ref}$ with $e(x)=x-x_{ref}$, and $\{x_{ref}, u_{ref}\}$ a feasible state/input orientation trajectory.

FIG. 2 is a flow diagram showing an example overview process 200 for controlling attitude maneuvers of a satellite system, wherein optimal orientation trajectories are generated in real-time by setting the torques defined by the method, without using predefined trajectories in the state space and without using the related feed-forward terms. By this method, the satellite may autonomously determine control attitude maneuvers that describe optimal orientation trajectories to transition from an estimated orientation to a target orientation in real-time. At 202, the estimated attitude state is determined, based at least in part on the sensed vehicle orientation. In some implementations the attitude state may be estimated by using gyroscopes, which provide the angular velocity, and star trackers which provide the angular position. The estimated attitude state may comprise angular velocity and attitude representation. For example, the angular velocity of the satellite may be expressed in satellite inertial to body frames angular velocity in body frame, and the attitude representation may be expressed in Modified Rodrigues Parameters (MRP).

At 204, at a determined step (operation point), the control system determines the parameters of the programming instructions that control the attitude maneuvers of the satellite, based at least on the estimated attitude state and the target. The parameters may comprise the matrices defining the system (e.g. A(x) and B(x)), and the weighting factors (e.g. Q(x) state error cost and R(x) control effort cost). The control law is subsequently updated, at multiple steps, to provide real-time optimal guidance, wherein each step has an estimated attitude state. In some instances, the parameters of the programming instructions that determine the torques to apply so that the satellite rotates are determined using nonlinear feedback control law at multiple operation points (e.g., each operation point) using State-Dependent Riccati Equation (SDRE) techniques. For example, the matrices A(x) and B(x) defining a satellite system including four reaction wheels, considering that the dynamics change accordingly to account for the angular momentum of the wheels, may be defined as follows:

$$A(x) = \begin{bmatrix} \frac{1}{4}(-\omega\sigma^t - [\omega\times] + 2\sigma^t\omega I_{3\times3}) & \frac{1}{4}I_{3\times3} \\ 0_{3\times3} & \prod^{-1}[(J\omega+h_w)\times] \end{bmatrix} \quad (9)$$

$$B(x) = \begin{bmatrix} 0_{3\times3} \\ \prod^{-1} \end{bmatrix} \quad (10)$$

Wherein $\Pi$ is $J-J_z \Upsilon \Upsilon^t$, $J_z$ is the reaction wheels' inertia along the spin vector, $\Upsilon$ is the reaction wheel set rotor direction versors arranged as columns in Body frame, and $\Upsilon \in \mathbb{R}^{3\times4}$ has in its columns the direction of each spin vector in Body versors. $h_w = J_z \Upsilon p_{wheels}$, where $p_{wheels}$ is the reaction wheels speed vector.

At 206, the Algebraic Riccati Equation (ARE) is solved for the determined parameters of the programming instructions, and the programming instructions provide a control action to direct the actuators to apply forces to control the attitude maneuvers of the satellite. Different approaches may be followed to solve the ARE for P(x) to compute the control action. In some embodiments, the SDRE strategy may be implemented using the Newton-Raphson method which searches iteratively for the result P(x) from an initial guess $P_o(x)$. Newton-Raphson method steps for error correction may be used, since it is numerically stabilizing, and has the advantage of delivering a stabilizing closed loop intermediate result, if needed. The ARE is solved using the Newton-Raphson with Max N iterations per control step, starting with the initial guess $P_0(x)$ and finding $P_{NR}(x)=P(x)$. The step $P_0(x)$ is set as $P_{NR}(x)$ ($P_0(x)=P_{NR}(x)$) so that the latest iteration is used in the subsequent iteration. Po is chosen to be positive definite and yield a globally stabilizing closed loop system. In some implementations, if the solution is not readily found, the strategy allows for a control feed which, even if not optimal, will help stabilize the system in the BIBO (Bounded Input-Bounded Output) sense, wherein $P_{NR}(x)=P_N(x)$. After a solution has been reached, since the state vector is not expected to change much from one step to the next, fewer iterations are needed since previous solution can be set as initial guess. When the application is cold started, or if computation errors yield an invalid solution, setting an initial guess to solve the equation (or even actually using it if no processing time is left) is beneficial for stability of the system. In some embodiments, the issue is addressed by resorting to the Lyapunov global stabilizing control system wherein external torques are deemed 0 without loss of generality:

$$u=-P_{gain}\sigma_{12B}-D_{gain}\omega_{12B} \quad (11)$$

And using equation (9), the gain may be deconstructed to form an initial guess as follows:

$$P_o = \begin{bmatrix} ^{11}P_o & ^{12}P_o \\ ^{12}P_o^t & ^{22}P_o \end{bmatrix} \quad (12)$$

The deconstructed matrix is not unique, but should be chosen to be positive definite and yield a globally stabilizing closed loop system. To form an initial guess using (11), $^{11}P_o$ should be a symmetric positive matrix that renders a well-conditioned $P_o$ positive definite matrix after the other blocks are set, and $^{12}P_o$ and $^{22}P_o$ should be obtained as follows:

$$(\Pi R(x)P_{gain})^t = {^{12}P_o}$$

$$\Pi R(x)D_{gain} = {^{22}P_o} \quad (13)$$

By cold starting the application with the initial guess as described herein, the optimality of the solution is guaranteed if computational capabilities abide and no numerical errors are produced. By updating the initial guess to the previous solution, fewer computations will be needed if the operation point does not change much. Additionally, in some embodiments, if the solution of the Riccati equation is not found for any reason, non-optimal control output which will convey global and asymptotic stability is applied, based on the initial guess as described herein ($P_{NR}(x)=P_0(x)$).

At 208, the next iteration initial guess to solve the ARE is set ($P_0(x)$), obtained after solving the ARE in the current iteration.

At 210, the programming instructions determine a control action (e.g., the torque is found), and the actuators orient the satellite following the control action provided by the control law. In some implementations, the optimal control law found solving the ARE equation to provide an optimal path is $u(x)=-R^{-1}B^T P(x)x$ wherein $P_{NR}(x)=P_0(x)$.

For a given attitude, angular velocity, and/or angular acceleration, the control law (programming instructions) provides the control action (torque) at which the sum of the norm of the set torques along the full trajectory are minimum, by determining the weighting factors (e.g. state error cost and control effort cost) for the given attitude, angular velocity and/or angular acceleration, setting a cost function and minimizing the cost function by solving the ARE. The control law provides torques to control the attitude maneuvers at the given attitude, angular velocity, and/or angular acceleration. The sum of the norm of the torques for the full trajectory is optimal given the state error and control costs. If the spacecraft were isoinertial, according to Euler's theorem of principal rotation vector, the vector will be fixed throughout the entire maneuver—since it is not the case, the rotation vector changes to minimize applied torque. Besides the rotation vector which is automatically defined, $Q(x)$ (state error cost) and $R(x)$ (control effort cost) weight functions define the shape of the velocity curve, and can be selected based on the state space specific set. If the control effort weight matrix $R(x)$ dominates, then only small torques will be applied and the angular momentum of the satellite is not likely to change much-appropriate for the constant angular velocity part of the usual feed-forward trapezoidal guidance strategy. On the other hand, if the state error weight matrix $Q(x)$ dominates, then larger torques can be applied and the weighted error norm is expected to drop quickly, suitable for tuning the final convergent approach to the target. This allows for a simple and effective tuning process via simulations where behavior within specific sets of the state space are selected independently.

Figure 3:
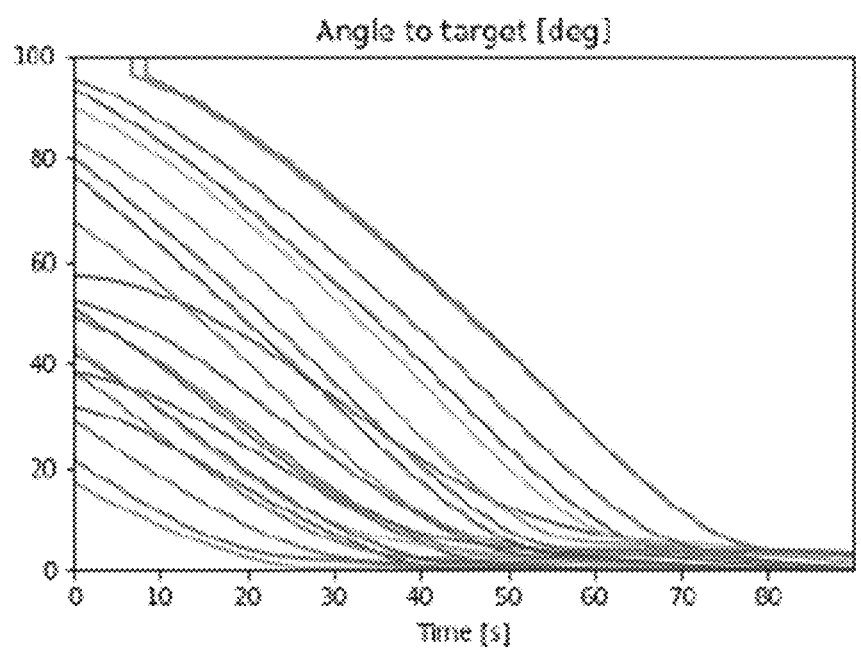
FIG. 3 shows the angle errors from a satellite's 21 attitude maneuvers (angle versus time) according to embodiments of the present disclosure.
Figure 4A:
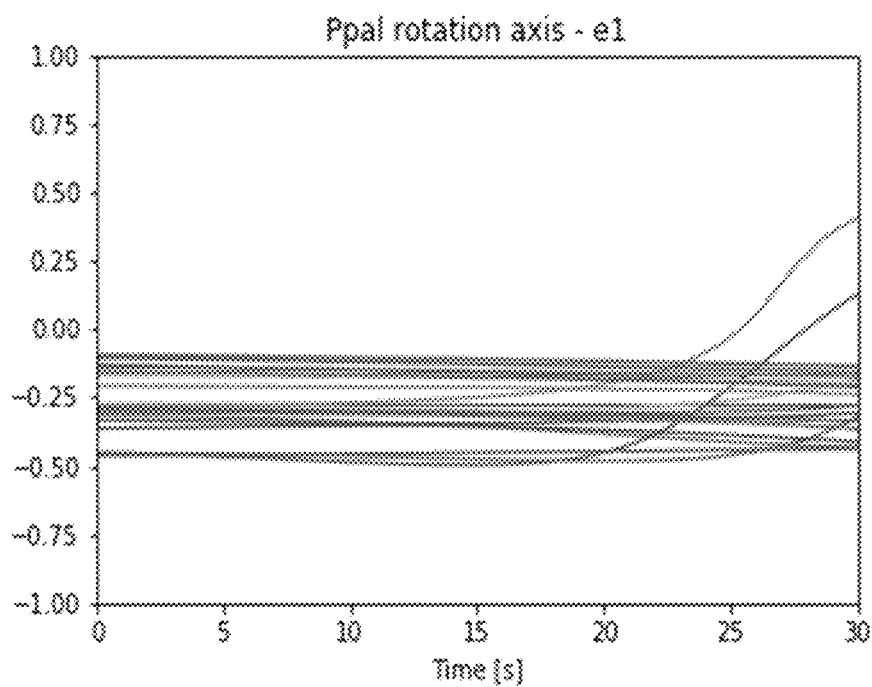
FIGS. 4A, 4B, and 4C, show the rotation vector of the satellite's 21 attitude maneuvers (rotation vector component versus time) according to embodiments of the present disclosure.
Figure 4B:
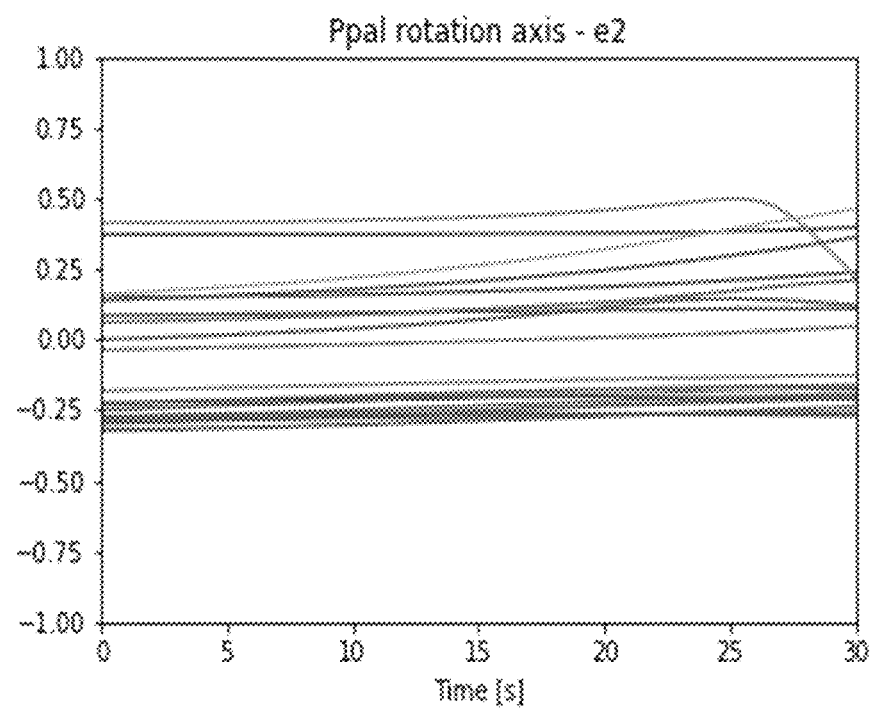
Figure 4C:
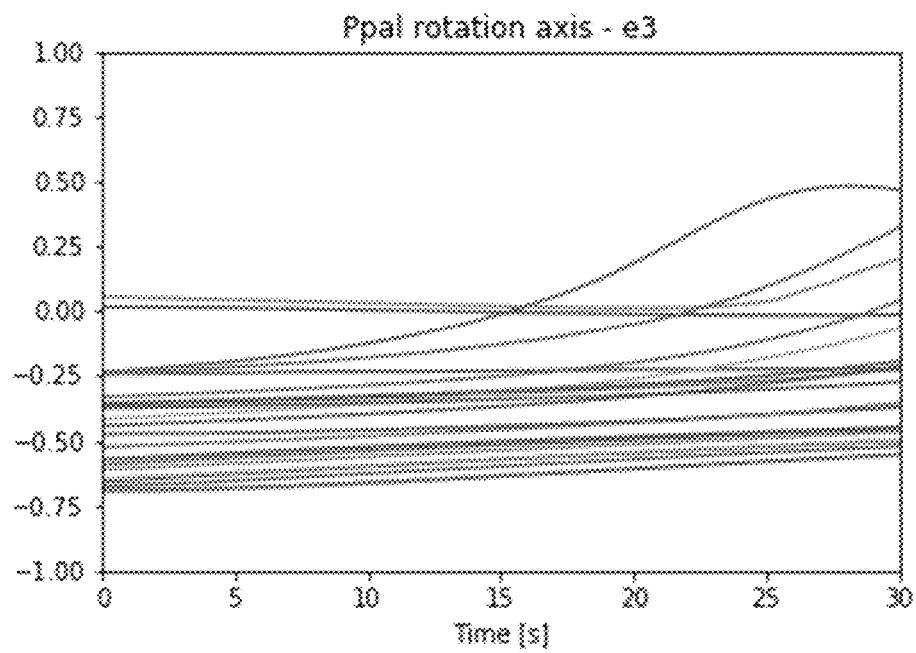
Figure 5A:
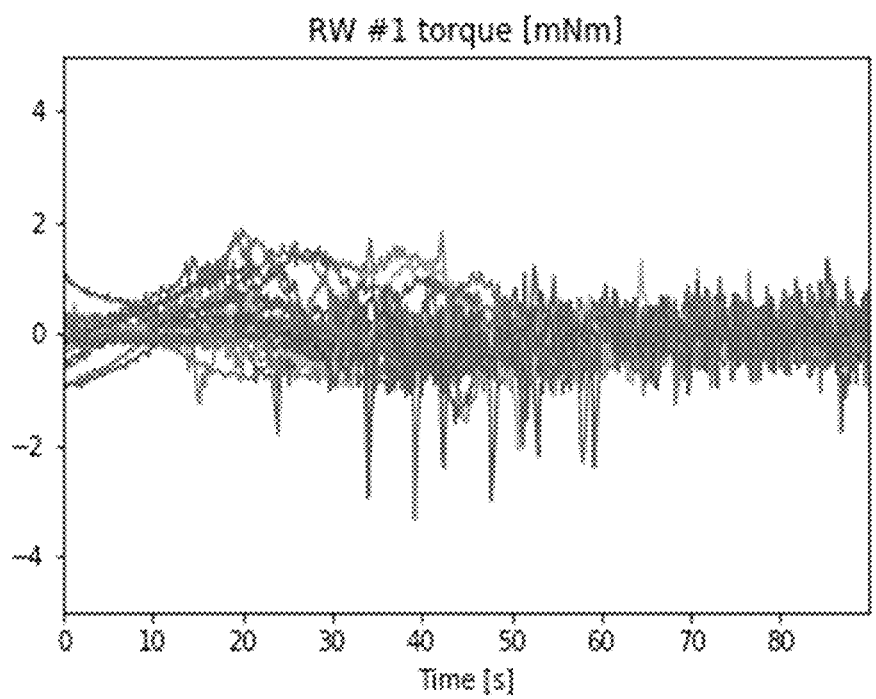
FIGS. 5A, 5B, 5C and 5D show the torque of the satellite's 21 attitude maneuvers (milliNewton-meter versus time) according to embodiments of the present disclosure.
Figure 5B:
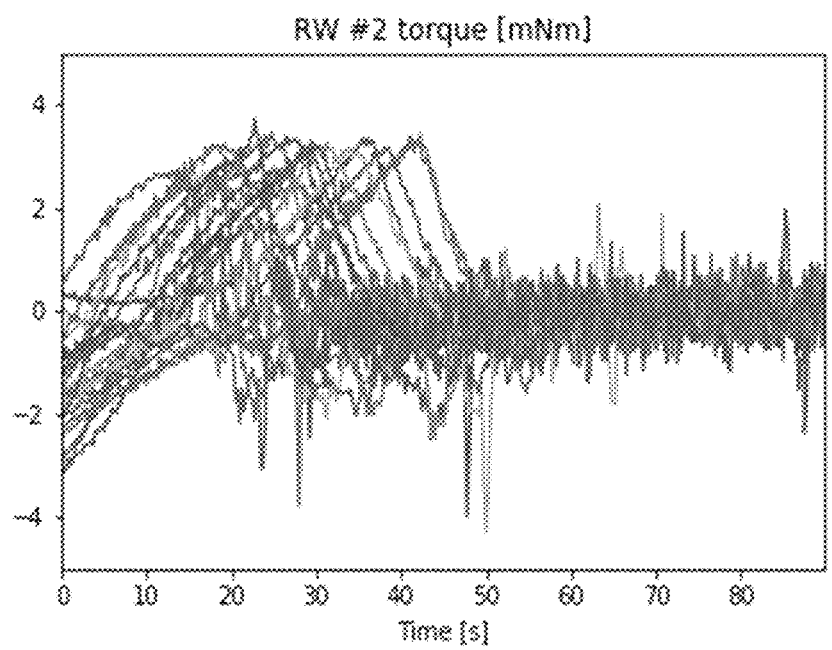
Figure 5C:
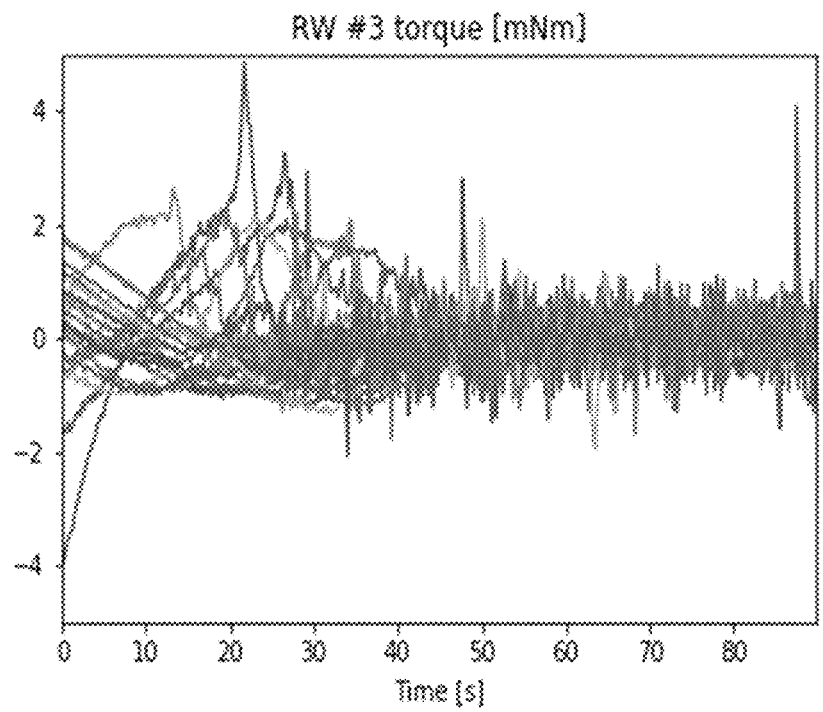
Figure 5D:
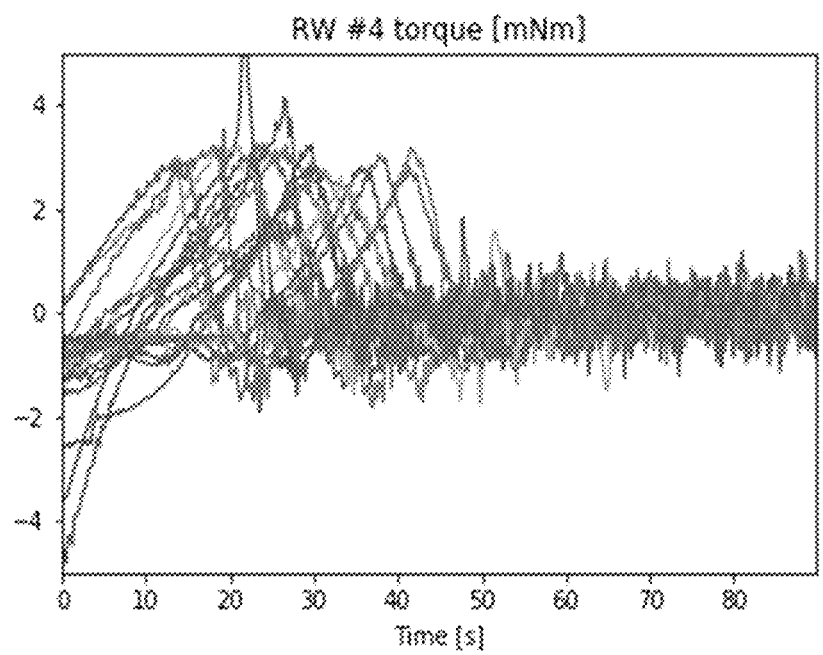

For example, experiments—run on a low-earth orbit satellite having a circular orbit with 42.7 deg of inclination at 550 km altitude, weighing 40 kg, and having actuators comprised of a set of four reaction wheels and magnetorquers to dump momentum—showed good performance in large maneuvers, successfully handling 100 degrees' arbitrary maneuvers at nearly 1.5 degree per second, tuned for low torques and power consumption. In FIG. 3, the angle errors from 21 maneuvers ranged from 30 to 90+ degrees are shown with almost arbitrary rotation axis (i.e. not aligned with satellite principal axes of inertia), which can be seen in FIG. 4A, FIG. 4B and FIG. 4C. The initial components of the $\{e_1; e_2; e_3\}$ set actually show the principal rotation vector which would yield the optimal guidance for an isoinertial spacecraft, the fact that it changes smoothly (especially while the angle is still representative, final corrections are done in arbitrary directions) is due to the optimal guidance for the actual spacecraft inertia. The smooth evolution in time of the instantaneous rotation vector $\{e_1, e_2, e_3\}$ for arbitrarily large maneuvers show the stability and robustness of the strategy, with respect to the approximate optimality and corrections of unmodeled effects. There is no predefined rotation vector to follow, so the smooth trajectory—done in nearly single rotations—is due to the SDRE optimal control strategy setting the path automatically.

The tuning of the system allowed for nearly 1.5 degrees per second cruising performance with very small torques and thus power consumption, which is shown in torques seldom reaching more than 4 mNm, keeping the actuators away from saturation—see figures FIG. 5A, FIG. 5B, FIG. 5C and FIG. 5D. Regarding computing power, 10 to 20 iterations for the Newton-Raphson are enough to solve the Riccati equation from application cold start, and 2-3 iterations were required when starting from the previous step optimal solution. The robustness of the maneuvers should be noted through the consistent behavior of both the rotation vector and torques, for arbitrary and large maneuvers.

Figure 6:
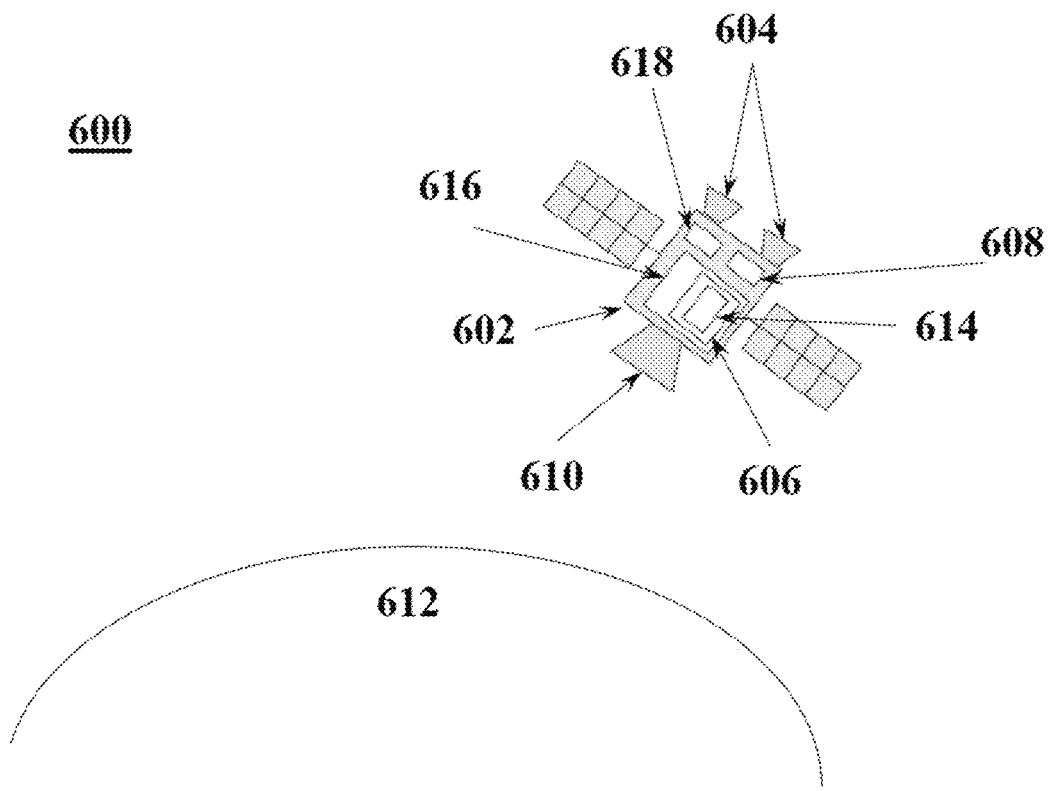
FIG. 6 is an illustration of a system including an attitude control module for controlling the attitude maneuvers of a vehicle according to embodiments of the present disclosure.

FIG. 6 is an illustration of a system including an attitude control module for controlling the attitude maneuvers of a vehicle according to embodiments of the present disclosure. The satellite system 600 may comprise satellite 602; sensors 604, such as star trackers, horizon sensors, sun sensors, or any combination of these; an attitude control module 606; and an attitude control mechanism 608 having actuators such as magnetorquers, reaction wheels, momentum wheels, control momentum gyros, or thrusters, configured to apply torques to the satellite 602 for example to point an imaging sensor 610 to a specific zone of the Earth 612. The attitude control module 606 may comprise a controller 614, such as a non-linear optimal regulator configured to execute programming instructions to apply torque(s) (control action) through the attitude control mechanism 608 so that the sequence of attitude maneuvers follows an optimal orientation trajectory in the state-space in the sense of minimizing the cost function. The programming instructions provide a control action by autonomously minimizing a cost function online, without predefining maneuvers neither offline nor when the maneuver starts. The control actions calculated in this manner provide a robust control method against model imperfections due to errors or omissions. The parameters of the control method described herein are easy to adjust, and the adjustment is done independently through one or more zones of the state space. In some embodiments, the attitude control method provides local and asymptotic stability and always converges within a predefined period of time if the maneuver starts within certain limits of angular velocity and the reaction wheels' velocity. Nevertheless, the control system also applies additional control strategies, such as sub-optimal strategies, in case the optimal strategy fails to converge within a predefined period of time. In addition, the strategy described herein is compatible with low processing power platforms as it distributes the burden through time, while regulating with a BIBO stabilizing feedback control law, and provides stability, robustness, performance and optimality.

The satellite system 600 may also comprise memory 616. Memory 616 may store program instructions and program modules that are loadable and executable on one or more processor(s) 618, as well as data generated during execution of, and/or usable in conjunction with, these programs, such as attitude states, and so forth. The attitude control module 606 may be executable by the one or more processors to control, such as through one or more input/output interfaces, the attitude control mechanism 608 including controlling the actuators through one or more electronic controls to move, position, or otherwise manipulate various mechanical aspects of the attitude control mechanism 608. Depending on the configuration and type of computing device used, memory 616 may include volatile memory (such as random access memory (RAM)) and/or non-volatile memory (such as read-only memory (ROM), flash memory, etc.). Memory 616 may also include additional removable storage and/or non-removable storage including, but not limited to, flash memory, magnetic storage and/or optical storage, and/or tape storage that may provide non-volatile storage of computer-readable instructions, data structures, program modules, and other useful data. Memory 616, is an example of non-transitory computer-readable media. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. An on-board attitude control system for controlling attitude maneuvers of a vehicle, the system comprising:
    an attitude control mechanism operable to orient the vehicle; and
    a control module configured to, at each step of multiple steps of a path:
        determine, based at least in part on an attitude state estimated at each step of the multiple steps, and on a target attitude state, an attitude error;
        determine, based at least in part on the attitude error, weighting factors of a cost function;
        minimize the cost function to obtain a control action, wherein the cost function comprises a state error cost and a control effort cost; and
        direct the attitude control mechanism to perform the control action to orient the vehicle,
    wherein the weighting factors of the cost function are determined as a function of one or more zones of a state-space;
    wherein minimizing the cost function comprises solving an Algebraic Riccati Equation (ARE) using a Newton-Rapshon method with a predetermined maximum number of iterations, starting with an initial guess chosen to yield a globally stabilizing solution of a closed loop system, wherein if no optimal solution is found for minimizing the cost function after the predetermined maximum number of iterations, an intermediate result is used to determine the control action, and the intermediate result is used as a next iteration initial guess of a first iteration of a next step.

2. The on-board attitude control system according to claim 1, wherein the control action comprises torques to apply to the vehicle to orient the vehicle, and wherein the control module is further configured to minimize a sum of the norm of the torques along the path.

3. A satellite system comprising:
    at least one sensor configured to estimate attitude states of the satellite system;
    an on-board attitude control mechanism operable to orient the satellite system; and
    an attitude control module configured to, at each step of multiple steps of a path:
        determine, based at least in part on an attitude state estimated at each step of the multiple steps, and on a target attitude state, an attitude error, wherein the attitude state estimated at each step of the multiple steps is based at least in part on information from the at least one sensor;
        determine, based at least in part on the attitude error, weighting factors of a cost function;
        minimize the cost function to obtain a control action, wherein the cost function comprises a state error cost and a control effort cost; and
        direct the on-board attitude control mechanism to perform the control action to orient the satellite system;
    wherein the weighting factors of the cost function are determined as a function of one or more zones of a state-space;
    wherein minimizing the cost function comprises solving an Algebraic Riccati Equation (ARE) using a Newton-Rapshon method with a predetermined maximum number of iterations, starting with an initial guess chosen to yield a globally stabilizing solution of a closed loop system, wherein if no optimal solution is found for minimizing the cost function after the predetermined maximum number of iterations, an intermediate result is used to determine the control action, and the intermediate result is used as a next iteration initial guess of a first iteration of a next step.

4. The satellite system according to claim 3, wherein the control action comprises torques to apply to the satellite system to orient the satellite system, and wherein the attitude control module is further configured to minimize a sum of the norm of the torques along the path.

5. The satellite system according to claim 3, wherein the at least one sensor is at least one of a gyroscope, a magnetometer, a star tracker, a horizon sensor, a sun sensor, or any combination thereof.

6. The satellite system according to claim 3, wherein the on-board attitude control mechanism is at least one of a magnetorquer, a reaction wheel, a momentum wheel, a control momentum gyro, a thruster, or any combination thereof.

7. The satellite system according to claim 3, wherein the target attitude state is determined based at least in part on a target orientation or a target orientation trajectory determined by an algorithm or a user, or based at least in part on a task the satellite system is tasked to perform.

8. A method for controlling attitude maneuvers of a vehicle, the method comprising, at each step of multiple steps of a path:
    determining, based at least in part on an attitude state estimated at each step of the multiple steps, and on a target attitude state, an attitude error;
    determining, based at least in part on the attitude error, weighting factors of a cost function;
    minimizing the cost function to obtain a control action, wherein the cost function comprises a state error cost and a control effort cost; and
    performing the control action to orient the vehicle;
    wherein the method further comprises determining the weighting factors of the cost function as a function of one or more zones of a state-space;
    wherein minimizing the cost function comprises solving an Algebraic Riccati Equation (ARE) using a Newton-Rapshon method with a predetermined maximum number of iterations, starting with an initial guess chosen to yield a globally stabilizing solution of a closed loop system, wherein if no optimal solution is found for minimizing the cost function after the predetermined maximum number of iterations, an intermediate result is used to determine the control action, and the intermediate result is used as a next iteration initial guess of a first iteration of a next step.

9. The method according to claim 8, further comprising:
obtaining a mathematical expression representing kinematics and dynamics of a spacecraft system;
obtaining a pseudo-linearized expression of the mathematical expression; and
setting, based on the pseudo-linearized expression of the mathematical expression, the cost function.

10. The method according to claim 9, wherein obtaining the pseudo-linearized expression of the mathematical expression comprises defining State-Dependent Coefficients (SDC), and the mathematical expression is based on Modified Rodrigues Parameters and Eulerian dynamic equations for a spacecraft with reaction wheels.

11. The method according to claim 8, wherein the initial guess is chosen to be a positive definite matrix $P_0$, with the following structure:

$$P_o = \begin{bmatrix} ^{11}P_o & ^{12}P_o \\ ^{12}P_o^t & ^{22}P_o \end{bmatrix}$$

wherein $^{11}P_0$ is a positive definite matrix and $^{12}P_0$ and $^{22}P_0$ are defined as follows:

$(\Pi R(x)P_{gain})^t = {}^{12}P_o$ $\Pi R(x)D_{gain} = {}^{22}P_o$ wherein $P_{gain}$ and $D_{gain}$ are positive numbers, $R(x)$ corresponds to the control effort cost of the cost function, $\Pi = J - J_z YY^t$ is the grouped inertia, $J \in R^{3 \times 3}$ is the inertia matrix of the vehicle written in Body frame, $J_z$ is the vehicle's reaction wheels' inertia along their spin vector, $Y \in R^{3 \times 4}$ is the matrix which columns are the direction of each spin vector in Body versors.

12. The on-board attitude control system according to claim 1, wherein the initial guess is chosen to be a positive definite matrix $P_0$, with the following structure:

$$P_o = \begin{bmatrix} ^{11}P_o & ^{12}P_o \\ ^{12}P_o^t & ^{22}P_o \end{bmatrix}$$

wherein $^{11}P_0$ is a positive definite matrix and $^{12}P_0$ and $^{22}P_0$ are defined as follows:

$(\Pi R(x)P_{gain})^t = {}^{12}P_o$ $\Pi R(x)D_{gain} = {}^{22}P_o$ wherein $P_{gain}$ and $D_{gain}$ are positive numbers, $R(x)$ corresponds to the control effort cost of the cost function, $\Pi = J - J_z YY^t$ is the grouped inertia, $J \in R^{3 \times 3}$ is the inertia matrix of the vehicle written in Body frame, $J_z$ is the vehicle's reaction wheels' inertia along their spin vector, $Y \in R^{3 \times 4}$ is the matrix which columns are the direction of each spin vector in Body versors.

13. The satellite system according to claim 3, wherein the initial guess is chosen to be a positive definite matrix $P_0$, with the following structure:

$$P_o = \begin{bmatrix} ^{11}P_o & ^{12}P_o \\ ^{12}P_o^t & ^{22}P_o \end{bmatrix}$$

wherein $^{11}P_0$ is a positive definite matrix and $^{12}P_0$ and $^{22}P_0$ are defined as follows:

$(\Pi R(x)P_{gain})^t = {}^{12}P_o$ $\Pi R(x)D_{gain} = {}^{22}P_o$ wherein $P_{gain}$ and $D_{gain}$ are positive numbers, $R(x)$ corresponds to the control effort cost of the cost function, $\Pi = J - J_z YY^t$ is the grouped inertia, $J \in R^{3 \times 3}$ is the inertia matrix of the vehicle written in Body frame, $J_z$ is the vehicle's reaction wheels' inertia along their spin vector, $Y \in R^{3 \times 4}$ is the matrix which columns are the direction of each spin vector in Body versors.

* * * * *